US012689324B2

(12) United States Patent　　　　　　(10) Patent No.:　US 12,689,324 B2
Zhang et al.　　　　　　　　　　　　　　(45) Date of Patent:　　　Jul. 21, 2026

(54) FRAME STRUCTURE OF PHOTOVOLTAIC MODULE AND PRODUCTION PROCESS THEREOF

(71) Applicant: ZHENSHI GROUP HUAMEI NEW MATERIALS CO., LTD., Tongxiang City (CN)

(72) Inventors: Jiankan Zhang, Tongxiang City (CN); Lijun Quan, Tongxiang City (CN); Jiadong Zhang, Tongxiang City (CN); Dong Jiang, Tongxiang City (CN); Shenglin Zhou, Tongxiang City (CN); Xuejian Li, Tongxiang City (CN); Zhaojun Liu, Tongxiang City (CN); Yunming Wang, Tongxiang City (CN)

(73) Assignee: Zhenshi Group Huamei New Materials Co., Ltd., Tongxiang City (CN)

( * ) Notice: Subject to any disclaimer, the term of this patent is extended or adjusted under 35 U.S.C. 154(b) by 0 days.

(21) Appl. No.: 18/863,292

(22) PCT Filed: Mar. 31, 2023

(86) PCT No.: PCT/CN2023/085307
§ 371 (c)(1),
(2) Date: Nov. 5, 2024

(87) PCT Pub. No.: WO2023/216759
PCT Pub. Date: Nov. 16, 2023

(65) Prior Publication Data
US 2025/0293635 A1　　　Sep. 18, 2025

(30) Foreign Application Priority Data
May 10, 2022　(CN) .......................... 202210503396.6

(51) Int. Cl.
*H02S 30/10*　　　(2014.01)
*B29C 70/16*　　　(2006.01)
(Continued)

(52) U.S. Cl.
CPC .............. *H02S 30/10* (2014.12); *B29C 70/16* (2013.01); *B29C 70/52* (2013.01); *B29L 2031/001* (2013.01)

(58) Field of Classification Search
CPC ...................................................... H02S 30/10
See application file for complete search history.

(56) References Cited

U.S. PATENT DOCUMENTS

2011/0259404 A1* 10/2011 Jang ........................ H02S 30/10
　　　　　　　　　　　　　　　　　　　　136/251
2022/0103117 A1* 3/2022 Gong ...................... H02S 30/10

FOREIGN PATENT DOCUMENTS

CN　　　101989622 A　　　3/2011
CN　　　102779877 A　　　11/2012
(Continued)

OTHER PUBLICATIONS

PCT International Search Report, Int. Application No. PCT/CN2023/085307, Int. Filing Date: Mar. 31, 2023, Dated: Jul. 5, 2023.
(Continued)

*Primary Examiner* — Jayne L Mershon
(74) *Attorney, Agent, or Firm* — Reising Ethington, P.C.

(57)　　　　　　ABSTRACT

The present disclosure relates to a frame structure of a photovoltaic module and a production process thereof. The frame structure is made of a composite material, and comprises a supporting arm extending in a first direction; a first mounting arm, a second mounting arm, and a third mounting arm, which are mounted on a same side of the supporting arm; and a fourth mounting arm connecting the second mounting arm and the third mounting arm. The first mount-
(Continued)

ing arm, the second mounting arm, and the first supporting structure form a mounting groove, and the second mounting arm, the third mounting arm, the fourth mounting arm, and the second supporting structure form a connecting groove. The inner wall of the mounting groove and the inner wall of the connecting groove are provided with reinforcing ribs.

12 Claims, 4 Drawing Sheets

(51) Int. Cl.
  B29C 70/52        (2006.01)
  B29L 31/00        (2006.01)

(56) References Cited

FOREIGN PATENT DOCUMENTS

| | | | |
|---|---|---|---|
| CN | 103358442 | A | 10/2013 |
| CN | 203883758 | U | 10/2014 |
| CN | 204334456 | U | 5/2015 |
| CN | 104761880 | A | 7/2015 |
| CN | 106995583 | A | 8/2017 |
| CN | 108683403 | A | 10/2018 |
| CN | 208063118 | * | 11/2018 |
| CN | 208063118 | U | 11/2018 |
| CN | 108948279 | A | 12/2018 |
| CN | 110932658 | A | 3/2020 |
| CN | 211830684 | U | 10/2020 |
| CN | 111934610 | A | 11/2020 |
| CN | 112428595 | * | 3/2021 |
| CN | 112428595 | A | 3/2021 |
| CN | 213094136 | U | 4/2021 |
| CN | 112859519 | A | 5/2021 |
| CN | 215268161 | U | 12/2021 |
| CN | 114726303 | A | 7/2022 |
| CN | 217282848 | U | 8/2022 |
| EP | 4525299 | A1 | 3/2025 |
| JP | 2004148732 | A | 5/2004 |
| JP | 2005347291 | A | 12/2005 |
| JP | 2009117728 | A | 5/2009 |
| JP | 2015056569 | A | 3/2015 |
| JP | 2016187263 | A | 10/2016 |
| JP | 2020199281 | A | 12/2020 |
| JP | 2022058066 | A | 4/2022 |
| JP | 2023149474 | A | 10/2023 |

OTHER PUBLICATIONS

Australian Examination Report No. 1, Application No. 2023267334, Applicant Name: Zhenshi Group Huamei New Materials Co., Ltd., Dated: Sep. 23, 2025.

European Search Report, Application No. 23802535.7-1002 / 4525299 PCT/CN2023085307, Applicant: Zhenshi Group Huamei New Materials Co., Ltd., Dated: Aug. 26, 2025.

Chinese 1st Office Action with English translation, Application No. 202210503396.6, Applicant: Razite GmbH Warman New Materials Co. Ltd., Title: Bember Structure for Photovoltaic, Dated: Jan. 27, 2026.

Japanese Office Action with English translation, Application No. 2024-566555, Dated: Nov. 17, 2025.

Japanese Decision of Refusal with Eng Translation, Patent Application No. 2024-566555, Title: Photovoltaic Module Frame Structure and Manufacturing Process Thereof, Applicant: Chenxi Group Hoamay New Materials Company Limited, Dated: Apr. 9, 2026.

* cited by examiner

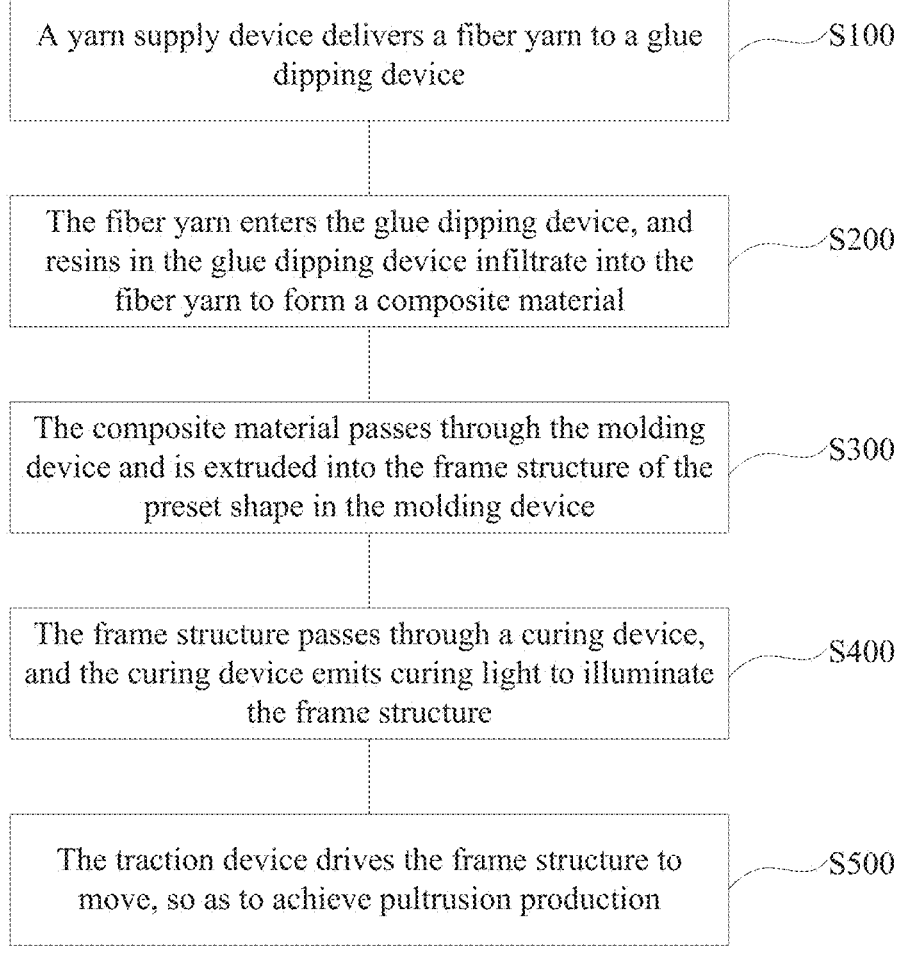

A yarn supply device delivers a fiber yarn to a glue dipping device ——S100

The fiber yarn enters the glue dipping device, and resins in the glue dipping device infiltrate into the fiber yarn to form a composite material ——S200

The composite material passes through the molding device and is extruded into the frame structure of the preset shape in the molding device ——S300

The frame structure passes through a curing device, and the curing device emits curing light to illuminate the frame structure ——S400

The traction device drives the frame structure to move, so as to achieve pultrusion production ——S500

FRAME STRUCTURE OF PHOTOVOLTAIC MODULE AND PRODUCTION PROCESS THEREOF

CROSS-REFERENCE TO RELATED APPLICATIONS

This is a national stage application filed under 37 U.S.C. 371 based on International Patent Application No. PCT/CN2023/085307, filed on Mar. 31, 2023, which claims priority to Chinese Patent Application No. 202210503396.6, filed on May 10, 2022, titled "FRAME STRUCTURE OF PHOTOVOLTAIC MODULE AND PRODUCTION PROCESS THEREOF", the disclosures of both of which are incorporated herein by reference in their entireties.

TECHNICAL FIELD

The present disclosure relates to, but is not limited to, a frame structure of a photovoltaic module and a production process thereof.

BACKGROUND OF THE INVENTION

The photovoltaic industry is developing rapidly, and photovoltaic modules are widely used in different fields. In the related art, a thermal curing pultrusion process is used to produce a frame structure. However, the thermal curing process is slow, which reduces the pultrusion production speed. The demand for photovoltaic module frames is gradually increasing, and the use of thermal curing pultrusion process to produce frame structures cannot meet market demand. In addition, the strength of frame structures made of fibers is generally not high, posing a safety hazard.

SUMMARY OF THE INVENTION

In order to overcome the problems existing in the related art, the present disclosure provides a frame structure of a photovoltaic module and a production process thereof.

A first aspect of embodiments of the present disclosure provides a frame structure of a photovoltaic module, configured to mount a photovoltaic structure, where the frame structure is in a long strip shape, and is made of a composite material, and the composite material is a reinforced fiber resin-based composite material made from physically mixing reinforced fibers and photocurable resins;

the frame structure includes: a supporting arm extending along a first direction, a first mounting arm, a second mounting arm, and a third mounting arm, which are mounted on a same side of the supporting arm, and a fourth mounting arm connecting the second mounting arm and the third mounting arm;

the first mounting arm, the second mounting arm, and the third mounting arm all extend along a second direction, and are arranged sequentially in the first direction;

the first direction is perpendicular to the second direction, and the first direction and the second direction are respectively perpendicular to an extension direction of the frame structure;

the supporting arm includes a first supporting structure, and a second supporting structure fixedly connected to the first supporting structure;

the first mounting arm, the second mounting arm, and the first supporting structure form a mounting groove, and the mounting groove is configured to mount the photovoltaic structure;

the second mounting arm, the third mounting arm, the fourth mounting arm, and the second supporting structure form a connecting groove, and the connecting groove is configured to mount a corner connector;

where an inner wall of the mounting groove and/or an inner wall of the connecting groove are provided with reinforcing ribs.

In an illustrative example, two first reinforcing ribs are provided in the connecting groove, and the two first reinforcing ribs are provided on the fourth mounting arm and the second supporting structure, respectively.

In an illustrative example, a first connecting beam is provided in the connecting groove, the first connecting beam connects the two first reinforcing ribs, and the first connecting beam divides the connecting groove into two chambers that are not in communication with each other.

In an illustrative example, a plurality of second connecting beams are provided in the connecting groove, the plurality of second connecting beams are arranged in an intersecting manner, and each of the second connecting beams connects diagonal positions of the connecting groove.

In an illustrative example, the first supporting structure and/or the first mounting arm are provided with a second reinforcing rib.

In an illustrative example, the first mounting arm is provided with a glue overflow groove;

in a case where the first mounting arm is not provided with the second reinforcing rib, the first mounting arm is provided with a notch to form the glue overflowing groove;

in a case where the first mounting arm is provided with the second reinforcing rib, the concave parts on both sides of the second reinforcing rib form the glue overflow groove.

In an illustrative example, the fourth mounting arm is provided with a notch to expose the inner wall of the connecting groove.

In an illustrative example, the inner wall and/or an outer wall of the connecting groove are provided with chamfered structures.

A second aspect of embodiments of the present disclosure provides a production process of a frame structure, the production process is configured to produce the frame structure of the first aspect, the production process of the frame structure including:

a yarn supply device delivering a fiber yarn to a glue dipping device;

the fiber yarn entering the glue dipping device, and resins in the glue dipping device infiltrating into the fiber yarn to form a composite material;

the composite material passing through a molding die, and being extruded into the frame structure of a preset shape in the molding die;

the frame structure passing through a curing device, and the curing device emitting curing light to illuminate the frame structure;

a traction device driving the frame structure to move, to achieve pultrusion production.

In an illustrative example, a mass proportion of the fiber yarn in the composite material is between 60% and 86%; and/or, the mass proportion of the resins in the composite material is between 14% and 40%.

In an illustrative example, the resins of the composite material include the following raw materials in parts by weight:

a main resin: 50-70 parts by weight;

a diluent: 20-40 parts by weight;

an auxiliary agent: 5-10 parts by weight;

an initiator: 1-3 parts by weight.

The technical solution provided by embodiments of the present disclosure may include the following beneficial effects: the frame structure is manufactured by using a reinforced fiber resin-based composite material made from reinforced fibers and photocurable resins, and the inner wall of the mounting groove and the inner wall of the connecting groove are provided with reinforcing ribs, so that the frame structure has high strength, good tensile and bending resistance, and strong bearing capacity. The frame structure is produced by using a photocuring pultrusion process, which significantly improves speed and production efficiency compared to the thermal curing pultrusion process in the related art.

It is to be understood that the above general description and the following detailed description are exemplary and explanatory only and are not intended to limit the present disclosure.

BRIEF DESCRIPTION OF DRAWINGS

The accompanying drawings, which are incorporated herein and constitute a part of the specification, illustrate embodiments consistent with the invention, and together with the description, serve to explain the principles of the invention.

FIG. 7 is a flowchart illustrating a pultrusion production process according to an exemplary embodiment.

DETAILED DESCRIPTION OF THE INVENTION

Figure 1:
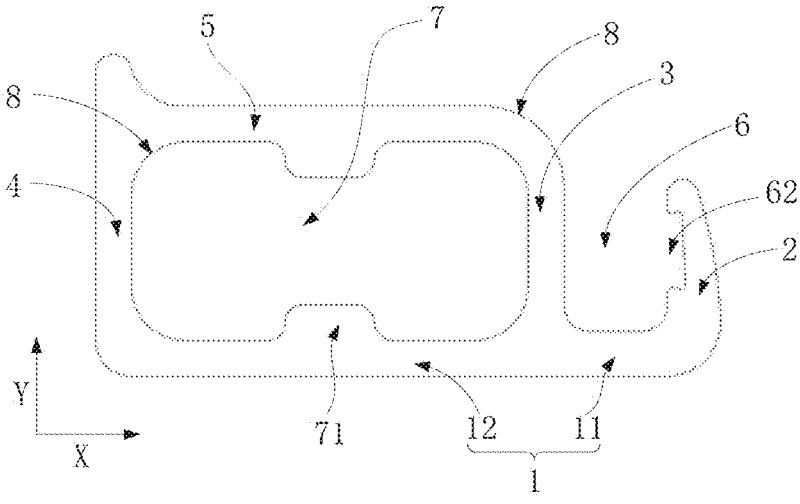
FIG. 1 is a cross-sectional view of a frame structure according to an exemplary embodiment.

Exemplary embodiments will be described in detail, examples of which are illustrated in the accompanying drawings. When the following description refers to the drawings, unless otherwise indicated, the same numbers in different drawings represent the same or similar elements. The implementations described in the following exemplary embodiments do not represent all implementations consistent with the present invention. Rather, they are merely examples of apparatus and methods consistent with some aspects of the present invention as detailed in the appended claims.

The photovoltaic industry is developing rapidly, and photovoltaic modules are widely used in different fields. In the related art, a thermal curing pultrusion process is used to produce a frame structure. However, the thermal curing process is slow, which reduces the pultrusion production speed. The demand for photovoltaic module frames is gradually increasing, and the use of thermal curing pultrusion process to produce frame structures cannot meet market demand. In addition, the strength of frame structures made of fibers is generally not high, posing a safety hazard.

At present, the only way to make up for the insufficiency of production speed is to expand the factory and add equipment, which increases energy consumption and equipment investments.

The present disclosure provides a frame structure of a photovoltaic module, which is configured to mount a photovoltaic structure. The frame structure is in a long strip shape and is made of a reinforced fiber resin-based composite material. The frame structure includes a supporting arm extending along a first direction, a first mounting arm, a second mounting arm and a third mounting arm, which are mounted on a same side of the supporting arm, and a fourth mounting arm connecting the second mounting arm and the third mounting arm. The first mounting arm, the second mounting arm, and the third mounting arm all extend along a second direction, and are arranged sequentially in the first direction. The first direction is perpendicular to the second direction, and the first direction and the second direction are respectively perpendicular to an extension direction of the frame structure. The supporting arm includes a first supporting structure and a second supporting structure fixedly connected to the first supporting structure. The first mounting arm, the second mounting arm, and the first supporting structure form a mounting groove, which is configured to mount the photovoltaic structure; and the second mounting arm, the third mounting arm, the fourth mounting arm, and the second supporting structure form a connecting groove, which is configured to mount the corner connector, where the inner wall of the mounting groove and the inner wall of the connecting groove are provided with reinforcing ribs. In the present disclosure, the frame structure is manufactured by using a reinforced fiber resin-based composite material made from reinforced fibers and photocurable resins, and the inner wall of the connecting groove and the inner wall of the mounting groove are provided with reinforcing ribs, so that the frame structure has high strength, good tensile and bending resistance, and strong bearing capacity. The frame structure is produced by using a photocuring pultrusion process, which significantly improves speed and production efficiency compared to the thermal curing pultrusion process in the related art.

According to an exemplary embodiment, as shown in FIG. 1, the present disclosure provides a frame structure of a photovoltaic module, configured to mount a photovoltaic structure. The frame structure is in a long strip shape (e.g., formed by a pultrusion process, and an extension direction of the long strip is a pultrusion production direction) and is made of a reinforced fiber resin-based composite material.

In this embodiment, the frame structure includes: a supporting arm 1 extending along the first direction (the X direction shown in FIG. 1), and a first mounting arm 2, a second mounting arm 3, and a third mounting arm 4, which are mounted on the same side of the supporting arm 1, and a fourth mounting arm 5 connecting the second mounting arm 3 and the third mounting arm 4. The first mounting arm 2, the second mounting arm 3 and the third mounting arm 4 all extend along the second direction (the Y direction shown in FIG. 1) and are arranged sequentially in the first direction. The first direction is perpendicular to the second direction, and the first direction and the second direction are respectively perpendicular to the extension direction of the frame structure. The supporting arm 1 includes a first supporting structure 11 and a second supporting structure 12 fixedly connected to the first supporting structure 11. The first mounting arm 2, the second mounting arm 3 and the first supporting structure 11 form a mounting groove 6, and the mounting groove 6 is configured to mount the photovoltaic structure. The second mounting arm 3, the third mounting arm 4, the fourth mounting arm, and the second supporting structure 12 form a connecting groove 7, and the connecting groove 7 is configured to mount a corner connector (not shown). Where the inner wall of the mounting groove 6 is provided with reinforcing ribs, and the support strength of the mounting groove 6 is improved by providing the reinforcing ribs. The inner wall of the connecting groove 7 may also be provided with reinforcing ribs to improve the connection strength of the connecting groove 7.

Figure 2:
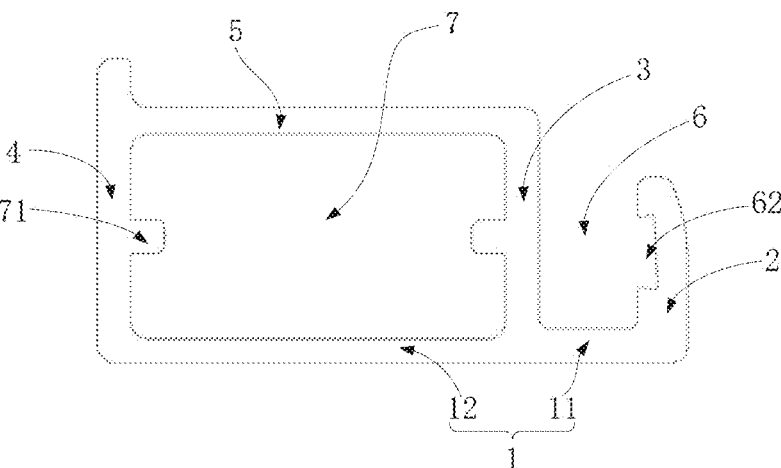
FIG. 2 is a cross-sectional view of the frame structure according to an exemplary embodiment.
Figures 3, 4:
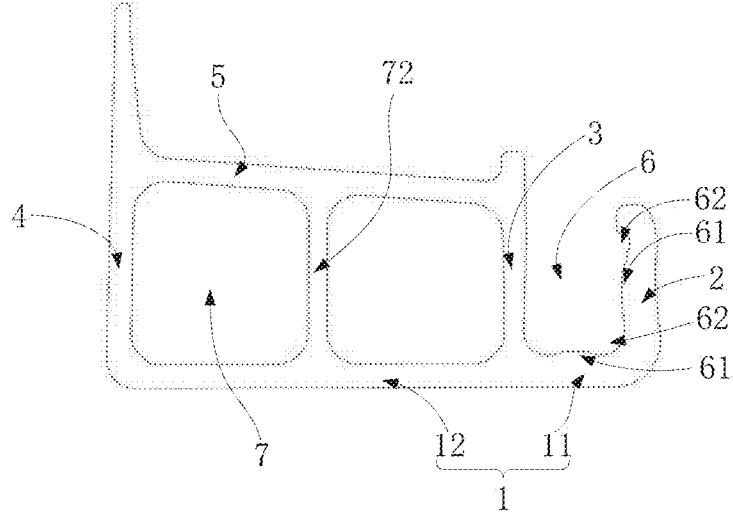
FIG. 3 is a cross-sectional view of the frame structure according to an exemplary embodiment.
FIG. 4 is a cross-sectional view of the frame structure according to an exemplary embodiment.

The connection strength of the frame structure refers to the snap-fit strength between the frame structure and the corner connector. The support strength of the frame structure refers to the support strength of the frame structure for the photovoltaic structure. Referring to FIGS. 1 to 3, reinforcing ribs may be provided in the middle area of the first supporting structure 11, the middle area of the second supporting structure 12 and the middle area of each mounting arm to prevent the middle areas of the mounting arms from bending or breaking when the pressure of the photovoltaic structure on the mounting arms is too large. Taking the second supporting structure 12 as an example, the second supporting structure 12 can provide support force to the photovoltaic structure (not shown) in a first direction (the X direction shown in FIG. 1). When the photovoltaic structure is too heavy, the middle area of the second supporting structure 12 may warp downward or upward. By setting a first reinforcing rib 71 in the middle area of the second supporting structure 12, the thickness of the middle area of the second supporting structure 12 is increased, thereby improving the bending resistance.

The composite material in this embodiment is the reinforced fiber resin-based composite material made from physically mixing reinforcing fibers and photocurable resins. For example, a reinforcing fiber bundle composed of multiple reinforcing fibers enters a glue dipping device, which sprays liquid photocurable resins onto the reinforcing fiber bundle. The photocurable resins can infiltrate between different reinforcing fiber bundles. The photocurable resins are cured after being illuminated by the curing device, thereby bonding the multiple reinforcing fibers. Where, the reinforcing fibers may be a mixture of any one or more of glass fiber, carbon fiber, synthetic fiber, mineral fiber and mixed fiber, and the photocurable resins may be any one or more of epoxy acrylate, polyurethane acrylate, polyester acrylate and unsaturated polyester resin.

In this embodiment, the frame structure is manufactured by using the reinforced fiber resin-based composite material made from reinforced fibers and photocurable resins, so that the frame structure has high strength, good tensile and bending resistance, and strong bearing capacity. The frame structure is produced by using the photocuring pultrusion process, which significantly improves speed and production efficiency compared to the thermal curing pultrusion process in the related art.

In an embodiment, referring to FIG. 1 and FIG. 2, the fourth mounting arm 5 may be arranged to be parallel to the supporting arm 1, that is, the fourth mounting arm 5 is perpendicular to the third mounting arm 4, and the fourth mounting arm 5 is perpendicular to the second mounting arm 3. In another example, referring to FIG. 3, the fourth mounting arm 5 is inclined relative to the supporting arm 1, that is, the fourth mounting arm 5 is not perpendicular to the third mounting arm 4, and the fourth mounting arm 5 is not perpendicular to the second mounting arm 3. This structure can disperse the load of the third mounting arm 4 and enhance the support strength.

In an embodiment, as shown in FIG. 1, two first reinforcing ribs 71 are provided on the inner wall of the connecting groove 7 in this embodiment, and the two first reinforcing ribs 71 are provided on the fourth mounting arm 5 and the second supporting structure 12, respectively. By providing the first reinforcing ribs 71 on the second supporting structure 12 and the fourth mounting arm 5, respectively, the thickness of the middle area of the second supporting structure 12 and the thickness of the middle area of the fourth mounting arm 5 are increased, thereby preventing the second supporting structure 12 and the fourth mounting arm 5 from bending when subjected to pressure from the photovoltaic structure, and improving the support strength of the frame structure for the photovoltaic structure.

As shown in FIG. 4, in this embodiment, a first connecting beam 72 may also be provided in the connecting groove 7. The first connecting beam 72 connects the two first reinforcing ribs 71 on the fourth mounting arm 5 and the second supporting structure 12, respectively, thereby dividing the interior of the closed connecting groove 7 into two chambers that are not in communication with each other. In this embodiment, the first connecting beam 72 is arranged in the closed connecting groove 7, and the first connecting beam 72 connects the middle area of the fourth mounting arm 5 and the middle area of the second supporting structure 12. Compared with separately arranging the first reinforcing rib 71 on the fourth mounting arm 5 and the second supporting structure 12, the strength of the middle area of the second supporting structure 12 and the fourth mounting arm 5 is further strengthened, thereby preventing the second supporting structure 12 and the fourth mounting arm 5 from bending when subjected to the pressure of the photovoltaic structure, and improving the pressure-bearing capacity of the frame structure. A plurality of parallel first connecting beams 72 may also be arranged in the connecting groove 7.

Figure 5:
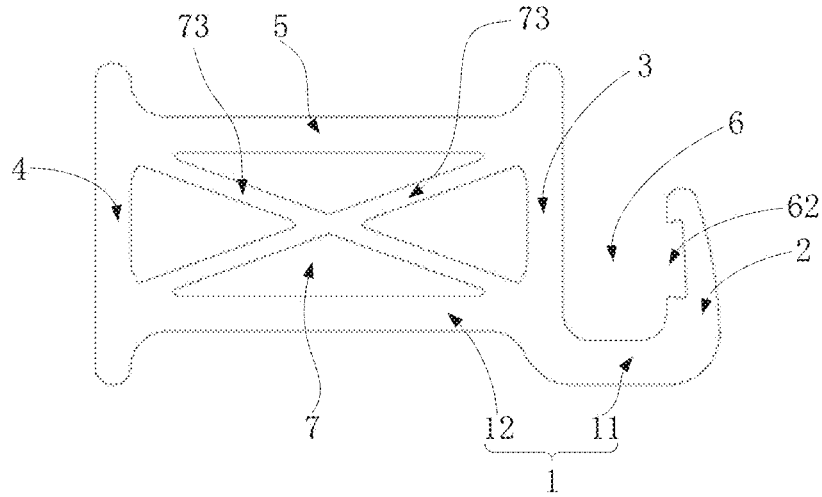
FIG. 5 is a cross-sectional view of the frame structure according to an exemplary embodiment.

As shown in FIG. 5, in this embodiment, a plurality of second connecting beams 73 may also be provided in the connecting groove 7. The plurality of second connecting beams 73 are arranged in an intersecting manner, and each second connecting beam 73 connects the diagonal positions of the connecting groove 7, thereby dividing the connecting groove 7 with a rectangular inner contour into a plurality of triangular chambers, improving the deformation resistance of each mounting arm forming the connecting groove 7, and thus improving the support strength of the frame structure to the photovoltaic structure.

Referring to FIGS. 4 and 5, in this embodiment, in the second direction (the Y direction shown in FIG. 1), the two ends of the second mounting arm 3 and the two ends of the third mounting arm 4 protrude from the supporting arm 1 and the fourth mounting arm 5, so that the cross-section of the frame structure is an I-shaped structure, which increases the contact area between the third mounting arm 4 and the mounting structure (not shown), as well as the contact area between the second mounting arm 3 and the photovoltaic structure, thereby reducing the pressure per unit area and improving the pressure-bearing capacity of the frame structure. Where, the mounting structures may be, such as, roofs, foundations, or other areas where photovoltaic structures can be placed.

In this embodiment, as shown in FIG. 3, the inner wall of the mounting groove 6 is provided with a second reinforcing rib 61. In an example, the second reinforcing rib 61 is disposed in the middle area of the first supporting structure 11. By disposing the second reinforcing rib 61 in the middle area of the first supporting structure 11, it is equivalent to thickening the thickness of the middle area of the first supporting structure 11, thereby improving the bending strength of the first supporting structure 11 and preventing the photovoltaic structure (not shown) from falling off due to bending (breaking) of the first supporting structure 11. In another example, the second reinforcing rib 61 may also be disposed on the first mounting arm 2. By disposing the second reinforcing rib 61 on the first mounting arm 2, the bending strength of the first mounting arm 2 can be improved, and thus the photovoltaic structure is prevented from falling off due to bending (breaking) of the first mounting arm 2.

In an embodiment, as shown in FIGS. 1 to 5, a glue overflow groove 62 is formed on a side of the first mounting arm 2 opposite to the second mounting arm 3, and the glue overflow groove 62 penetrates the frame structure in the extension direction of the frame structure. By providing the glue overflow groove 62, excess glue in the glue coating process may flow out through the glue overflow groove 62, thereby preventing the glue from contaminating the photovoltaic structure (not shown).

Where, referring to FIG. 3, when the inner wall of the mounting groove 6 is provided with the second reinforcing ribs 61, the second reinforcing ribs 61 cause one side of the first supporting structure 11, which serves as the inner wall of the mounting groove 6, to appear uneven, and one side of the first mounting arm 2, which serves as the inner wall of the mounting groove 6, also to appear uneven. The convex part is the second reinforcing rib 61, and the concave part may form the glue overflow groove 62, so that excess glue flows out through the glue overflow groove 62, thereby preventing the glue from contaminating the photovoltaic structure.

The second reinforcing rib 61 may be provided only on the first supporting structure 11, or may be provided only on the first mounting arm 2, or may be provided on both the first supporting structure 11 and the first mounting arm 2.

Figure 6:
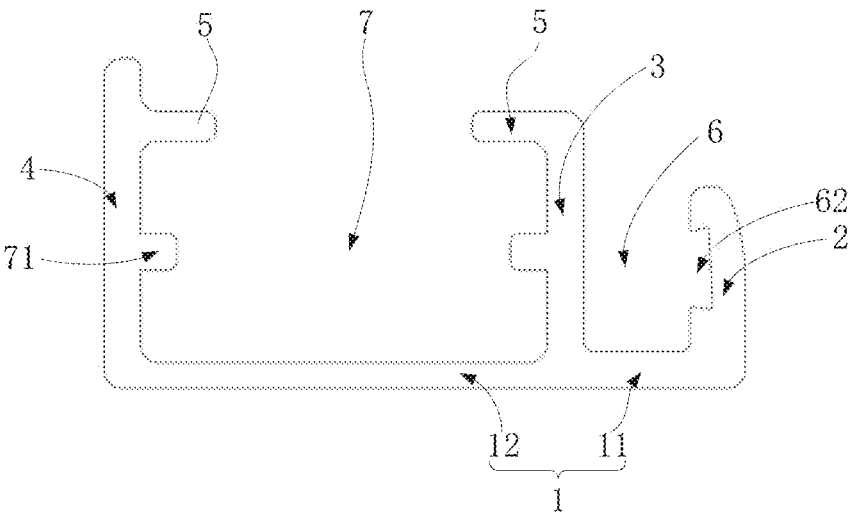
FIG. 6 is a cross-sectional view of the frame structure according to an exemplary embodiment.

In an embodiment, referring to FIG. 6, in the frame structure provided in this embodiment, the fourth mounting arm 5 is provided with a notch to form two shorter fourth mounting arms 5, so that the connecting groove 7 forms an opening, thereby exposing the inner wall of the connecting groove 7. In this manner, the curing light of the curing device may illuminate the inner wall of the connecting groove 7, and by illuminating more photocurable resins, the curing speed in the production process of the frame structure is improved, and the curing device may use only one photocuring lamp to provide curing light, saving costs.

In an embodiment, as shown in FIG. 1, FIG. 4, and FIG. 5, in this embodiment, the connecting groove 7 is further provided with chamfered structures 8, and the chamfered structure 8 is a rounded corner structure. Referring to FIG. 1, the chamfered structures 8 may be provided on the inner wall and the outer wall of the closed connecting groove 7. In an example, referring to FIG. 1, the chamfered structures 8 of the inner wall of the connecting groove 7 are provided at the following positions: the connection between the second mounting arm 3 and the second supporting structure 12, the connection between the second mounting arm 3 and the fourth mounting arm 5, the connection between the third mounting arm 4 and the second supporting structure 12, the connection between the third mounting arm 4 and the fourth mounting arm 5, and both sides of the first reinforcing rib 71. In an example, as shown in FIG. 1, the chamfered structure 8 of the outer wall of the connecting groove 7 is provided at the following position: the connection between the second mounting arm 3 and the fourth mounting arm 5. In this embodiment, by providing the chamfered structure 8, on the one hand, the thickness of the corner position of the closed connecting groove 7 is increased to improve the structural strength; and on the other hand, the chamfered structure makes it possible to avoid stress concentration when the frame structure contacts the mounting structure (not shown) and the corner connector, and when the frame structure contacts the photovoltaic structure, thereby improving the deformation resistance.

In other possible embodiments, as shown in FIG. 1 and FIG. 4, the inner wall and the outer wall of the mounting groove 6 may also be provided with chamfered structures. For example, referring to FIG. 4, at the connection between the first mounting arm 2 and the first supporting structure 11, the inner wall and outer wall of the mounting groove 6 are both provided with chamfered structures 8, and the chamfered structures 8 increase the thickness of the connection, thereby preventing the first mounting arm 2 from warping that causes the photovoltaic structure to fall off.

According to an exemplary embodiment, as shown in FIG. 7, the present disclosure further provides a pultrusion production process, the pultrusion production process includes:

Step S100: A yarn supply device delivers a fiber yarn to a glue dipping device.

In this step, the fiber yarn is arranged on the yarn supply device according to a predetermined specification, and one end of the fiber yarn passes through the glue dipping device and a molding device to be connected to a traction device. The traction device may pull the fiber yarn to move in the pultrusion production system at a preset speed. When the fiber yarn passes through the molding device, the fiber yarn is extruded into a frame structure of a preset shape. It should be noted that, the fiber yarn is a reinforcing fiber, for example, the reinforcing fiber may be a mixture of any one or more of glass fiber, carbon fiber, synthetic fiber, mineral fiber and mixed fiber.

Step S200: The fiber yarn enters the glue dipping device, and resins in the glue dipping device infiltrate into the fiber yarn to form a composite material.

In this step, in an example, a plurality of fiber yarns enter the glue dipping device, and the glue dipping device may spray resins onto the fiber yarns by spraying, so that the resins enter the gaps between the fiber yarns to bond the plurality of fiber yarns. In another example, a plurality of fiber yarns may be immersed in the resins, and the resins may enter the gaps between the fiber yarns.

The resins in the glue dipping device are photocurable resins, for example, any one or more of epoxy acrylate, polyurethane acrylate, polyester acrylate, and unsaturated polyester resin. The viscosity of the photocurable resins does not exceed 1000 cp. Photocurable resins can cure quickly under the illumination of ultraviolet light emitted by a curing lamp. Photocurable resin cures faster than thermoplastic resin and thermosetting resin. Therefore, using the photocurable resin and the photocuring process to produce frame structures can greatly improve the pultrusion production speed.

Step S300: The composite material passes through the molding device and is extruded into the frame structure of the preset shape in the molding device.

In this step, the molding device is provided with a mold cavity, and the mold cavity gradually becomes smaller along the pultrusion direction. The shape of the mold cavity at an outlet end of the molding device is a cross-sectional shape of the frame structure.

In the embodiment of the present disclosure, the mold cavity of the molding device is adjusted, so that the connecting groove of the extruded frame structure has a notch. When the frame structure with the notch is illuminated with ultraviolet light, the inner wall of the connecting groove may be illuminated and quickly cured, thereby improving the pultrusion speed of the photocuring pultrusion system.

Step S400: The frame structure passes through a curing device, and the curing device emits curing light to illuminate the frame structure.

In this step, during the process of the frame structure passing through the curing device, the main curing light of the curing device is set directly above the frame structure, and the notch of the frame structure is also located above the frame structure. Therefore, the curing light emitted by the main curing light first passes through the notch downward and may directly illuminate the inner wall of the connecting groove, thereby illuminating more surfaces of the frame structure, and greatly improving the curing speed.

Step S500: The traction device drives the frame structure to move, so as to achieve pultrusion production.

In this step, the traction device may transport the frame structure at a preset speed. The preset speed is, for example, between 5 m/min and 50 m/min.

In an embodiment, step S100 in the above embodiment further includes:

Step S110: The yarn supply device supplies yarns to the glue dipping device at a preset yarn supply amount.

In this step, the amount of fiber yarns provided by the yarn supply device to the glue dipping device needs to ensure that the mass proportion of the fiber yarns in the composite material is between 60% and 86%, and the mass proportion of the resins in the composite material is between 14% and 40%. The frame structure made of the composite material has high strength, good tensile and bending resistance, and strong load-bearing capacity.

In an embodiment, step S200 in above embodiment further includes:

Step S210: The resins are prepared according to a predetermined ratio.

In this step, the resins of the composite material may be prepared by mixing the following raw materials, which include a main resin, a diluent, an auxiliary agent and an initiator.

Where, the predetermined ratio is as follows: 40-60 parts by weight of the main resin, 30-50 parts by weight of the diluent, 1-10 parts by weight of the auxiliary agent, and 1-3 parts by weight of the initiator. The resins made with this ratio have a viscosity not exceeding 500 cp and can infiltrate between multiple fiber yarns at a faster infiltration speed and fully infiltrate. After the speed of resin immersion in the fiber yarn is increased, the traction device can increase the traction speed, and then improve the pultrusion production speed.

It should be noted that, the main resin may be one or more of epoxy acrylate, modified epoxy acrylate, polyurethane acrylate, polyester acrylate, and unsaturated polyester resin. The reactive monomer diluent is a monomer containing one or two carbon-carbon double-bond functional groups, for example, one or more of isobornyl acrylate (IBOA), acryloyl morpholine (ACMO), 2-phenoxyethyl acrylate (PHEA), 1,6-hexanediol diacrylate (HDDA), and dipropylene glycol diacrylate (DPGDA). The auxiliary agent is a monomer containing two or more carbon-carbon double-bond functional groups, for example, one or more of ethoxylated trimethylolpropane triacrylate (THEICTA) and tris (2-hydroxyethyl) isocyanuric acid triacrylate (TMP3POTA). The initiator is a free radical photoinitiator with UV-active, for example, one or more of 1-hydroxycyclohexyl phenyl ketone (HCPK), 2-hydroxy-2-methyl-1-phenylpropanone (HMPP), benzoin diethyl ether (DMPA), and phenyl bis(2, 4,6-trimethylbenzoyl) phosphine oxide (BAPO).

In an exemplary embodiment, after step S400 is completed, the pultrusion production process further includes:

Step S410: The spray device sprays a protective coating on the surface of the frame structure.

In this step, the nozzle may be arranged around the frame structure to spray the protective coating on the surface of the frame structure.

In this embodiment, after spraying the protective coating on the frame structure, the pultrusion production process further includes:

Step S420: A heating device heats the frame structure to dry the protective coating.

In an exemplary embodiment, after step S500 is completed, the pultrusion production process further includes:

Step S600: A cutting device cuts the frame structure according to a preset specification.

In this step, the frame structure that passes through the traction device on the production line needs to be cut before the frame structure can be put into use. Where the preset specification includes a cutting length and a cutting angle. The cutting length, which refers to the length and width of the photovoltaic structure, needs to be selected and set according to the customer's needs. The cutting angle refers to the frame shape of the photovoltaic structure. For example, for a frame structure used for mounting a rectangular photovoltaic structure, the cutting angle is 45°, and for a frame structure used for mounting a regular hexagonal photovoltaic structure, the cutting angle is 60°.

Other embodiments of the present disclosure will be apparent to those skilled in the art from consideration of the specification, and practice of the embodiments disclosed herein. The present disclosure is intended to cover any modifications, uses or adaptations of the present disclosure. These modifications, uses or adaptations follow the general principles of the present disclosure and include common knowledge or customary technical means in the technical field that are not disclosed in the present disclosure. The specification and the embodiments are considered as exemplary only, and a true scope and spirit of the disclosure are indicated by the following claims.

It should be understood that the present disclosure is not limited to the exact structure that has been described above and shown in the drawings, and that various modifications and changes may be made without departing from the scope of the present disclosure. The scope of the present disclosure is limited only by the appended claims.

INDUSTRIAL APPLICABILITY

In the present disclosure, the frame structure is manufactured by using a reinforced fiber resin-based composite material made from reinforced fibers and photocurable resins, and the inner wall of the mounting groove and the inner wall of the connecting groove are provided with reinforcing ribs, so that the frame structure has high strength, good tensile and bending resistance, and strong bearing capacity. Compared with the thermal curing pultrusion process in the related art, the production speed and the production efficiency are greatly improved by using the photocuring pultrusion process.

The invention claimed is:
1. A frame structure of a photovoltaic module, configured to mount a photovoltaic structure, the frame structure comprises: a supporting arm extending along a first direction; a first mounting arm, a second mounting arm, and a third mounting arm, which are mounted on a same side of the supporting arm; and a fourth mounting arm connecting the second mounting arm and the third mounting arm;

the first mounting arm, the second mounting arm, and the third mounting arm all extend along a second direction, and are arranged sequentially in the first direction;

the first direction is perpendicular to the second direction, and the first direction and the second direction are respectively perpendicular to an extension direction of the frame structure;

the supporting arm comprises a first supporting structure, and a second supporting structure fixedly connected to the first supporting structure;

the first mounting arm, the second mounting arm, and the first supporting structure form a mounting groove, and the mounting groove is configured to mount the photovoltaic structure;

the second mounting arm, the third mounting arm, the fourth mounting arm, and the second supporting structure form a connecting groove, and the connecting groove is configured to mount a corner connector;

wherein an inner wall of the mounting groove is provided with reinforcing ribs, wherein the first mounting arm is provided with a second reinforcing rib.

2. The frame structure of the photovoltaic module of claim 1, wherein at least one of an inner wall or an outer wall of the connecting groove is provided with chamfered structures.

3. The frame structure of the photovoltaic module of claim 1, wherein the frame structure is in a long strip shape, and is made of a composite material, and the composite material is a reinforced fiber resin-based composite material made from physically mixing reinforced fibers and photo-curable resins.

4. The frame structure of the photovoltaic module of claim 3, wherein an inner wall of the connecting groove is provided with reinforcing ribs.

5. The frame structure of the photovoltaic module of claim 4, wherein two first reinforcing ribs are provided in the connecting groove, and the two first reinforcing ribs are provided on the fourth mounting arm and the second supporting structure, respectively.

6. The frame structure of the photovoltaic module of claim 5, wherein a first connecting beam is provided in the connecting groove, the first connecting beam connects the two first reinforcing ribs, and the first connecting beam divides the connecting groove into two chambers that are not in communication with each other.

7. The frame structure of the photovoltaic module of claim 6, wherein a plurality of second connecting beams are provided in the connecting groove, the plurality of second connecting beams are arranged in an intersecting manner, and each of the second connecting beams connects diagonal positions of the connecting groove.

8. The frame structure of the photovoltaic module of claim 4, wherein the first supporting structure is provided with the second reinforcing rib.

9. The frame structure of the photovoltaic module of claim 8, wherein the first mounting arm is provided with a glue overflow groove;

in a case where the first mounting arm is not provided with the second reinforcing rib, the first mounting arm is provided with a notch to form the glue overflowing groove;

in a case where the first mounting arm is provided with the second reinforcing rib, concave parts on both sides of the second reinforcing rib form the glue overflow groove.

10. A frame structure of a photovoltaic module, configured to mount a photovoltaic structure, the frame structure comprises: a supporting arm extending along a first direction; a first mounting arm, a second mounting arm, and a third mounting arm, which are mounted on a same side of the supporting arm; and a fourth mounting arm extends between the second mounting arm and the third mounting arm;

the first mounting arm, the second mounting arm, and the third mounting arm all extend along a second direction, and are arranged sequentially in the first direction;

the first direction is perpendicular to the second direction, and the first direction and the second direction are respectively perpendicular to an extension direction of the frame structure;

the supporting arm comprises a first supporting structure, and a second supporting structure fixedly connected to the first supporting structure;

the first mounting arm, the second mounting arm, and the first supporting structure form a mounting groove, and the mounting groove is configured to mount the photovoltaic structure;

the second mounting arm, the third mounting arm, the fourth mounting arm, and the second supporting structure form a connecting groove, and the connecting groove is configured to mount a corner connector;

wherein an inner wall of the mounting groove is provided with reinforcing ribs, wherein the first mounting arm is provided with a second reinforcing rib;

wherein the fourth mounting arm is provided with a notch to expose the inner wall of the connecting groove.

11. The frame structure of the photovoltaic module of claim 10, wherein the frame structure is in a long strip shape, and is made of a composite material, and the composite material is a reinforced fiber resin-based composite material made from physically mixing reinforced fibers and photo-curable resins.

12. The frame structure of the photovoltaic module of claim 11, wherein an inner wall of the connecting groove is provided with reinforcing ribs.

* * * * *